United States Patent
Warke et al.

(10) Patent No.: US 6,516,025 B1
(45) Date of Patent: Feb. 4, 2003

(54) HIGH-SPEED UPSTREAM MODEM COMMUNICATION

(75) Inventors: Nirmal C. Warke, Dallas, TX (US); Murtaza Ali, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/301,712

(22) Filed: Apr. 29, 1999

(51) Int. Cl.[7] .............................. H04B 1/38; H04L 5/16
(52) U.S. Cl. ....................... 375/222; 375/220; 375/221; 375/231; 375/232
(58) Field of Search .................................. 375/222, 286, 375/257, 216, 219, 220, 221, 230, 231, 232, 242

(56) References Cited

U.S. PATENT DOCUMENTS

| | | | |
|---|---|---|---|
| 5,528,625 A | | 6/1996 | Ayanoglu et al. ............. 375/222 |
| 5,710,790 A | * | 1/1998 | Herzberg et al. ............. 375/219 |
| 6,081,555 A | * | 6/2000 | Olafsson ...................... 375/242 |
| 6,151,364 A | * | 11/2000 | Ruether et al. ............... 375/254 |
| 6,173,015 B1 | * | 1/2001 | Eyuboglu et al. ............. 375/286 |

* cited by examiner

*Primary Examiner*—Phuong Phu
(74) *Attorney, Agent, or Firm*—Pedro P. Hernandez; W. James Brady, III; Frederick J. Telecky, Jr.

(57) ABSTRACT

A client-side modem (20) having capability of improved data rate upstream communications via a codec (2) in a central office (CO) to an Internet service provider (ISP) (10) is disclosed. The disclosed modem (20) includes a digital signal processor (DSP) (14) that, for upstream communications, performs a bit mapping function (22) upon the digital data so that the digital words are mapped to slicing levels of analog-to-digital conversion circuitry (A/D) (6) in the central office codec (2); in addition, bit mapping function (22) preferably maps the digital signal into symbols having fewer bits each than the maximum defined by the number of slicing levels of the A/D (6). A pre-equalize filter function (26) applies an approximate inverse channel response filter (as measured during the training process) to the bit mapped digital data, to maximize the transmitted data rage over the dispersive analog subscriber loop (ASL), with consideration for an average transmit power maximum specification. As a result of this compensation, the analog signals received by the codec (2) are converted into digital form with a low level of quantization noise, thus permitting higher upstream data rates. Also, transmission spectral shaping (24) in the DSP (14), according to the channel characteristics, can be used to increase upstream rates still further.

19 Claims, 6 Drawing Sheets

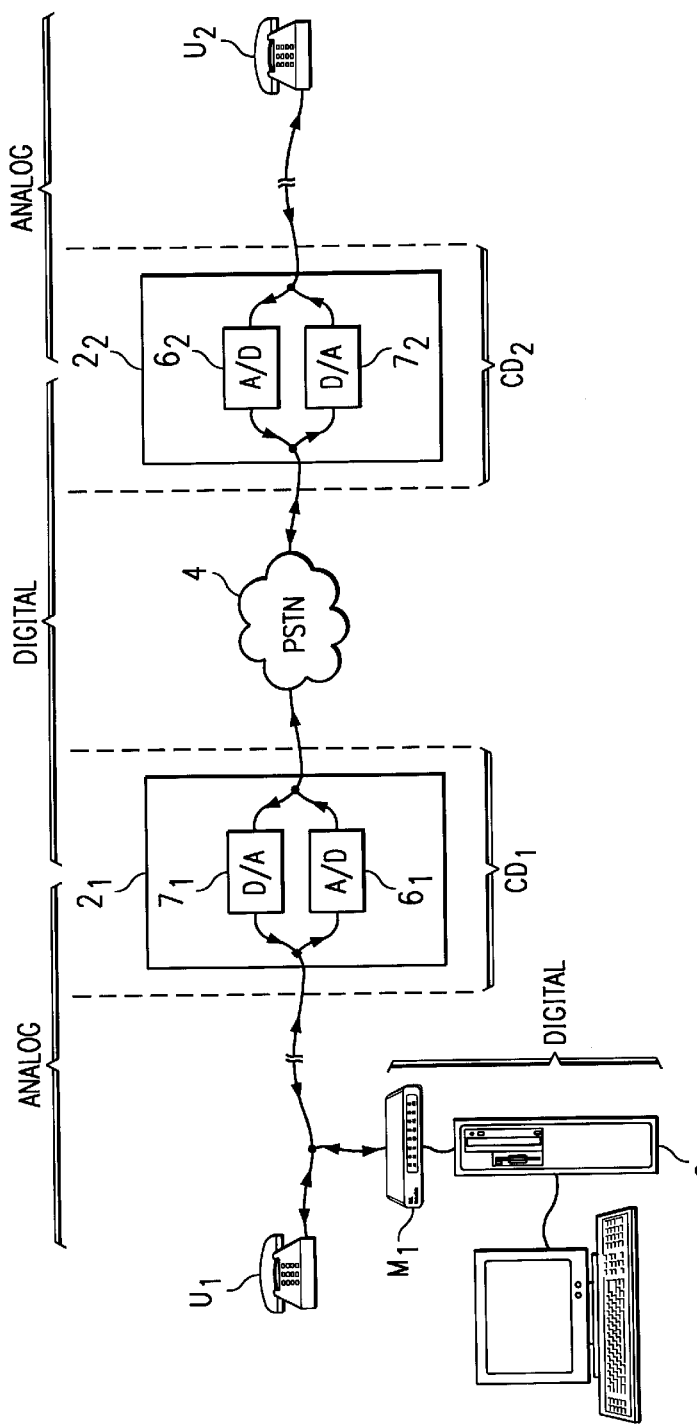
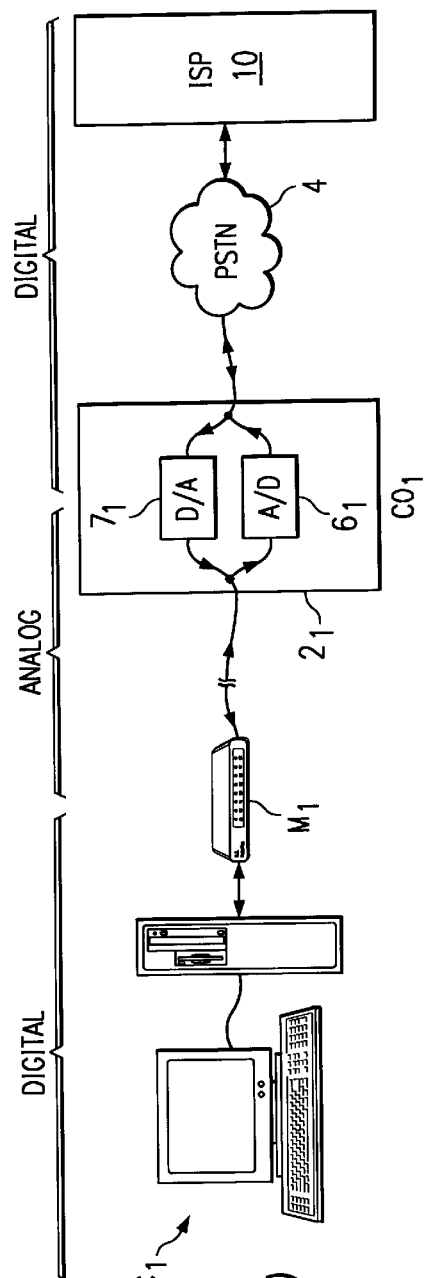

HIGH-SPEED UPSTREAM MODEM COMMUNICATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of telecommunications, and is more specifically directed to improved upstream communications from a client modem to a telephone network central office over conventional analog telephone lines.

With the recent explosion in Internet usage by both business and consumers, the use of dial-up modem communication between personal computer users and Internet service providers (ISPs) over conventional telephone networks, such as the Public Switched Telephone Network (PSTN) in the United States, has become widespread. Important advances have been made in recent years that have greatly increased the data rate at which communications may be carried out over the existing telephone network, realized to a large degree over twisted-pair wires. These important advances have also greatly reduced the cost of equipment required for such high data rate communication, as well as the cost of providing communications services.

These advances have also improved the capacity of telephone networks to carry higher volumes of voice and data traffic. One such advance is the advent of digital communications over the telephone network among the various "central offices", generally carried out over fiber-optic cable. One well-known technique used to implement such digital communications utilizes coder/decoder functions ("codecs") at the central offices, as will now be described.

FIG. 1 illustrates a simple example of communication between a pair of telephones U over a conventional telephone network. In this example, telephones $U_1$ and $U_2$ are remote from one another, such that telephone $U_1$ is associated with central office $CO_1$, and telephone $U_2$ is associated with central office $CO_2$. As is well known in the art, the term "central office" refers to a field location of the local telephone company at which switching and other telephone network management functions take place. Communications between telephones $U_1$ and telephone $U_2$, in this conventional example, will be carried out by way of analog connections between telephones $U_1$, $U_2$ and their respective central offices $CO_1$, $CO_2$; the analog communication system between telephones U and central offices CO are referred to as "subscriber loops". Codecs $2_1$, $2_2$ are provided within central offices $CO_1$ and $CO_2$, respectively, to convert the analog signals received from their respective telephones $U_1$, $U_2$ into digital signals for communication over PSTN 4, and vice versa. As illustrated in FIG. 1, each codec 2 includes analog-to-digital converter (A/D) 6, for converting analog signals traveling from its associated telephone U into digital signals to be sent over PSTN 4; conversely, each codec 2 also includes digital-to-analog converter (D/A) 7, for converting digital signals received from PSTN 4 into analog signals for communication to its associated telephone U. The digital communication over PSTN 4 may be carried out over fiber optic facilities or other high speed communications trunks, according to conventional standards such as DSO, SONET, and the like. As a result of the conversion of the analog voice signals into digital bitstreams, the volume of telephone traffic carried by PSTN 4 can be quite large.

Each of codecs 2 include an associated A/D 6, as noted above. According to conventional implementations, each A/D 6 converts the incoming analog signal into a stream of digital values by way of sampling. Typically, the sampling rate of A/D 6 is 8 kHz. As is fundamental for A/D conversion, each sample of the analog signal is converted into a digital value that most closely approximates its amplitude. In modern voice telephone networks, the conversion carried out by A/D 6 typically follows a μ-law estimation, rather than a linear mapping of analog to digital values, in order to provide a pleasant voice signal with relatively accurate dynamic range. In any event, error results from the approximation that is necessarily in A/D conversion, amounting to the difference between the true amplitude of the sampled analog signal and its digital approximation; such error is commonly referred to as "quantization error". The amount of quantization error, or conversely the precision of the conversion, depends directly upon the number of bits used to express the digital value. Current standards for voice communication call for an eight-bit analog-to-digital conversion at the central office, such that each analog sample amplitude is assigned to one of 256 possible values. As such, quantization error may be significant, especially at high data rates.

As noted above, modem communications among computing devices has now become widely popular, especially with the widespread use of the Internet by business and individuals. As is fundamental in the art, a modem (shortened from "modulator/demodulator") is a device that converts signals to be communicated from the computer over the telephone network from a digital bitstream into an analog signal within the voice band (and vice versa), so that data communications can be readily carried out over the same telephone network used for voice communications. FIG. 1 illustrates a typical home computer $C_1$ having a modem $M_1$ that is connected into the telephone network, for example at the same location at which telephone $U_1$ is connected. As illustrated in FIG. 1, digital communications are of course carried out between computer $C_1$ and modem $M_1$, but communications between modem $M_1$ and central office $CO_1$ are analog, just as are the voice communications between telephone $U_1$ and central office $CO_1$. As such, communications from computer $C_1$ and PSTN 4 begin as digital data, are converted into analog signals by modem $M_1$, and are converted back into digital form by A/D $6_1$ in central office $CO_1$.

In the arrangement of FIG. 1, codec $2_1$ necessarily inserts error into the communication of digital data from computer $C_1$ to PSTN 4. This error is directly due to the quantization error of A/D $6_1$. Because of the approximation carried out by A/D $6_1$, its digital output will not always match the corresponding digital value presented by computer $C_1$ to modem $M_1$ for conversion into the analog domain. The presence of this quantization error at central office codecs is currently the limiting factor in the data rates at which modem communications may be carried out over modern telephone networks, especially considering that Federal Communications Commission rules limit the maximum power of telephone communications.

By way of further background, the V.34 standard for modem communications at data rates of up to 33.6 kbps utilizes a precoder in the transmitting modem. The modulation used according to this standard is quadrature amplitude modulation (QAM). This precoder is intended to implement the feedback coefficients obtained in decision feedback equalization for the communications channel, partially compensating for channel distortion; the remainder of the distortion is compensated by a linear equalizer at the receiving modem.

Recently, it has been observed that the bulk of modem communications are telephone companies carry out digital communications between the PSTN and the ISPs, whether or not such communications travel through a central office. An example of this conventional arrangement, for a single remote computer $C_1$, is shown in FIG. 2. In this example, computer $C_1$ communicates digitally with modem $M_1$ as before; modem $M_1$ in turn communicates with central office $CO_1$ using analog signals. Central office $CO_1$ includes codec $2_1$ as before, with A/D $6_1$, converting the analog signals from modem $M_1$ into digital signals for communication over PSTN 4; codec $2_1$ also includes D/A $7_1$ for converting digital traffic into analog signals, for communication to modem $M_1$. As shown in FIG. 2, however, ISP 10 communicates digitally with PSTN 4 (perhaps through a central office, not shown in FIG. 2), and as such no analog-to-digital conversion of signals from PSTN 4 is required.

In the conventional arrangement of FIG. 2, data communicated from ISP 10 to computer $C_1$ is not converted from analog into digital by a central office codec in order to be communicated over the telephone network. The only conversion from analog into digital for such "downstream" data is at modem $M_1$; however, the precision with which modem $M_1$ effects this conversion may be very high, as this conversion is not subject to the voice communications standards (e.g., 8 kHz sampling rate, 8-bit μlaw conversion) as are central office codecs. As a result, quantization error is not a data-rate-limiting factor in these downstream communications. In contrast, upstream communications from computer $C_1$ to ISP 10 is converted from analog to digital by A/D $6_1$ in codec $2_1$ of central office $CO_1$. This conversion, as noted above, can involve significant quantization error, which limits the maximum data rate for such upstream communications.

Recent modem communications standards have recognized the difference between upstream and downstream modem communications. According to the current V.90 recommendation, downstream (ISP-to-client) communications may now be carried out, over conventional telephone network wiring, at a data rate up to as high as 56 kbps, using pulse code modulation (PCM) of the digital signal. However, the quantization noise in the upstream (client-to-ISP) path caused by the central office A/D conversion, currently limits the upstream data rate to 33.6 kbps.

By way of further background, U.S. Pat. No. 5,528,625 describes a technique by way of which the effects of quantization noise from central office codec A/D conversion may be limited, thus permitting higher data rate upstream communications. As noted therein, the effects of quantization distortion, or quantization noise, may be reduced by utilizing the μlaw quantization levels themselves as the digital channel symbol "alphabet" of each of multiple communications legs at the modem. Each of the communications legs are separately equalized to precompensate for the response of the subscriber loop. As a result, the digital-to-analog modulation carried out by the modem generates analog signals that are effectively at the μlaw quantization levels of the A/D converter in the central office codec, pre-compensated for channel distortion.

Another issue in modem communications is the less than optimal bandwidth of bandpass filters in conventional codecs. While the A/D converter in conventional codecs sample at 8 kHz, the subscriber loops are typically bandlimited, by codec bandpass filters, to a range of approximately 3.3 kHz over which the frequency response is usable. This reduces the effective maximum symbol rate (assuming no quantization error) to approximately 6 kHz which limits the data rate to 48 kbps, for eight-bit encoding.

The above-referenced U.S. Pat. No. 5,528,625 describes the separate equalization of each of multiple transmission legs to eliminate quantization noise. In effect, multiple transmit and receive filters are defined, with the number of such channels corresponding to the number of valid independent pulse-code modulation (PCM) symbols to be transmitted per eight symbol frame. Because of the limitation resulting from the bandlimiting of the subscriber loop, at most six of eight symbols carry valid data, and thus six transmit and receive filters are defined. While this approach appears to have merit in improving the data rate of conventional modems, its implementation appears to be relatively complex and thus quite costly.

BRIEF SUMMARY OF THE INVENTION

It is therefore an object of the present invention to provide a modem and method of operating the same that provides improved data rate upstream communications.

It is a further object of the present invention to provide such a modem and method that can achieve such improved data rate over conventional twisted pair telephone networks.

It is a further object of the present invention to provide such a modem and method that may be implemented at relatively low cost.

It is a further object of the present invention to provide such a modem and method that may be implemented in a computationally efficient manner.

It is still a further object of the present invention to provide such a modem and method that would require minimal changes to existing communications standards.

Other objects and advantages of the present invention will be apparent to those of ordinary skill in the art having reference to the following specification together with its drawings.

The present invention may be implemented by way of a pre-equalizer arrangement in the transmission of data by client-side modems. As part of the connection protocol, the client modem transmits a training sequence that is received by the central office digital modem; the digital modem determines the pre-equalizer coefficients according to channel effects upon the training sequence, preferably according to an error minimization that considers a maximum average voiceband power limit. These coefficients are forwarded to the client modem, which inserts the coefficients into a digital pre-equalizer filter function.

BRIEF DESCRIPTION OF THE SEVERAL VIEWS OF THE DRAWING

FIG. 1 is an electrical diagram, in block form, of a conventional connection of telephones and a modem, carrying out digital communications over the modern Public Switched Telephone Network.

FIG. 2 is an electrical diagram, in block form, of a conventional connection of a computer and modem to an Internet service provider over the modern Public Switched Telephone Network.

DETAILED DESCRIPTION OF THE INVENTION

Figure 3:
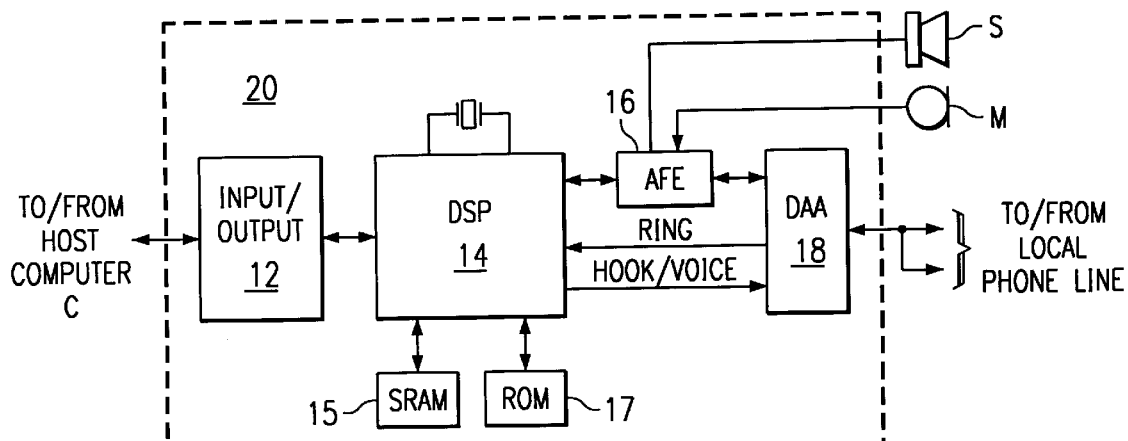
FIG. 3 is an electrical diagram, in block form, of a client modem constructed according to the preferred embodiment of the invention.

Referring now to FIG. 3, the construction of modem 20 according to the preferred embodiment of the present invention will now be described, by way of example. As will become apparent from the following description, the present invention may be implemented into modems of various construction, particularly those using programmable logic devices such as digital signal processors (DSPs) for the processing of digital signals therein. As such, it is contemplated that those of ordinary skill in the art, having reference to this specification, will be readily able to implement the present invention within modem circuitry of various construction, depending upon the particular environment and design parameters for their specific applications. Accordingly, it is contemplated that the construction of modem 20 illustrated in FIG. 3 and described hereinbelow is presented by way of example only. In this regard, the boundaries among the various integrated circuits in modem 20 of FIG. 3 are exemplary, it being understood that more or fewer functions may be included within any one or more of the integrated circuits shown in FIG. 3.

Modem 20 of FIG. 3 is contemplated to be capable of high speed operation, such as at least the V.90 recommendation promulgated by the International Telecommunications Union (ITU-T). In this regard, the general organization of modem 20 includes input/output interface circuit 12, which is typically implemented as an application specific integrated circuit (ASIC) for interfacing modem 20 to the bus or serial port of host computer C.

Input/output interface circuit 12 is in bidirectional communication with digital signal processor (DSP) integrated circuit 14. DSP 14 is preferably of relatively high computational capacity, an example of which is the TMS320C6x digital signal processor family available from Texas Instruments Incorporated. DSP 14 performs digital signal processing functions, such as Fast Fourier Transforms (FFT) and inverse FFTs, digital filters, pre-emphasis functions, and other signal processing operations as will be described hereinbelow, under the control of program instructions stored in and retrievable from read-only memory (ROM) 17. Static random access memory (SRAM) 15 is also connected to DSP 14, and is provided for the storing of data tables, time critical program code, and the like; in addition, DSP 14 itself preferably includes some amount of read/write memory for the temporary storage of intermediate data and results as used in the signal processing functions of DSP 14. DSP 14 is a synchronous device, and operates according to clock circuitry based upon an external crystal oscillator, as shown in FIG. 3.

DSP 14 is in communication with analog front end (AFE) device 16, and with data access arrangement (DAA) circuit 18. AFE 16 is a mixed-signal (i.e., involving both digital and analog operations) integrated circuit that provides all loop interface components necessary for data communications other than those which involve high voltages, for both transmit and receive interface functions. These functions include some amount of filtering, encoding and decoding, and the like. AFE 16 has an output coupled to speaker port S, and an input coupled to microphone port M, to drive and receive audio signals for use in multimedia modem functions. In addition, AFE 16 is bidirectionally connected to DAA 18, which is the integrated circuit responsible for bidirectionally interfacing modem 20 to the local phone line. DAA 18 includes protective components, ring detection, and a high-speed line driver and receiver for driving and receiving data to and from the local phone line, in full-duplex fashion. DAA 18 communicates between the local phone line and AFE 16, in both directions; additionally, DAA 18 provides a ring signal to DSP 14, and receives relay control signals from DSP 14 relating to the hook and voice states that are to be placed onto the local phone line by modem 20, under the control of host computer C via DSP 14.

According to the preferred embodiment of the present invention, DSP 14 carries out certain functions, by way of executing program instructions stored in ROM 17, to provide high-speed upstream communications of data from host computer C to the local phone line, particularly in forwarding such upstream communications to an Internet service provider (ISP) that is in digital communication with the central office associated with modem 20 in the Public Switched Telephone Network (PSTN). These functions as utilized according to the preferred embodiment of the invention will now be described.

Figure 4:
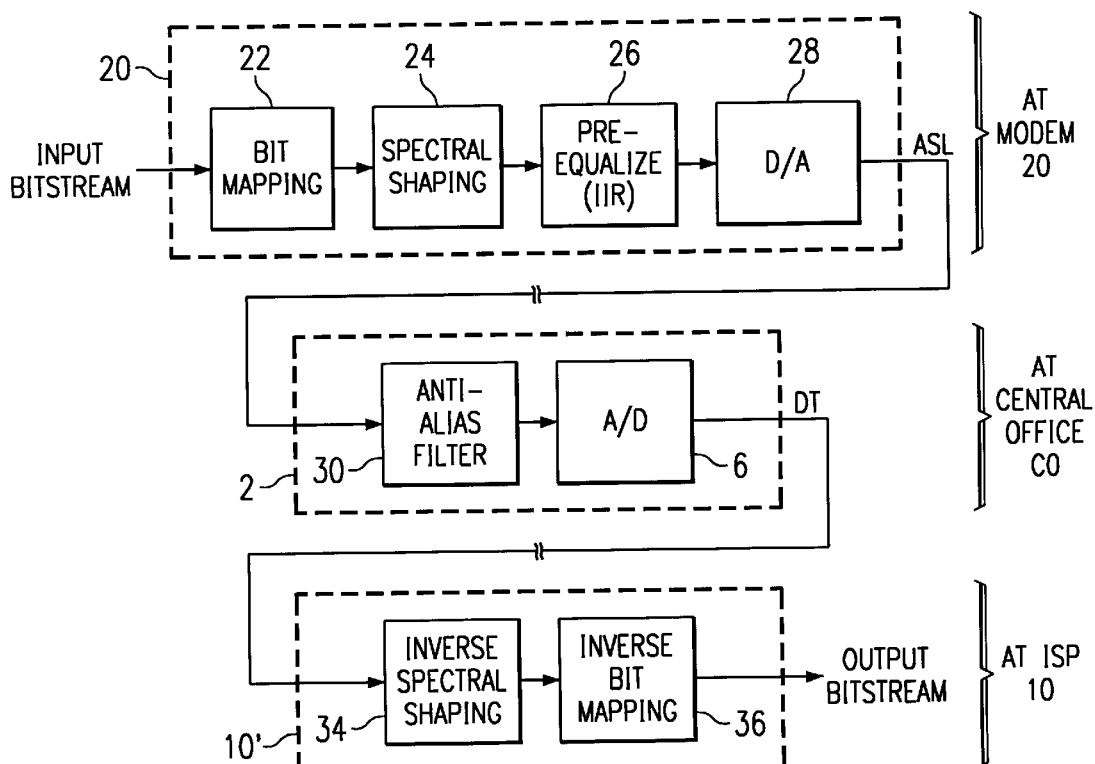
FIG. 4 is a functional diagram illustrating the functions carried out in normal upstream communications by the combination of a client modem constructed according to the present invention, a central office codec, and a digital modem such as may be resident at an Internet service provider.

Referring now to FIG. 4, certain of the functional operations that are carried out by modem 20 in normal upstream communications according to the preferred embodiment of the invention, in combination with codec 2 of the central office CO associated therewith, and with digital modem 10' at Internet service provider (ISP) 10, will now be described. As illustrated in FIG. 4, modem 20 communicates with codec 2 at central office CO over analog subscriber loop ASL, and codec 2 communicates with digital modem 10' at ISP 10 over digital trunk DT.

In the state of FIG. 4, training of modem 20 and digital modem 10' in the manner to be described hereinbelow has already been carried out; this brief description is presented here in order to provide the reader with an understanding of the purpose of the training process according to the preferred embodiment of the invention. Further, the functions illustrated in FIG. 4, particularly relative to modem 20, are not necessarily assigned to particular integrated circuits, but instead refer to functions carried out by their respective apparatus. It is contemplated, however, that those functions of modem 20 that are applied to digital signals will be executed by DSP 14 of modem 20, as shown in FIG. 3.

As shown in FIG. 4, modem 20 receives an input bitstream, typically from host computer C, that is to be communicated over the current modem connection to ISP 10, via the associated central office CO. Within modem 20, bit mapping function 22 is first applied (by DSP 14) to the input bitstream, in order to map each symbol of the input bitstream into a pulse code modulation (PCM) constellation. As is well known in the art, a PCM signal corresponds to a sequence of analog levels that each correspond to one of a specified number of digital words. For example, PCM modulation of an eight-bit signal will result in an analog signal having 256 possible levels, each level corresponding to one of the 256 possible values of an eight-bit word. According to the preferred embodiment of the invention, the available analog signal levels are selected to correspond to the slicing levels of the analog-to-digital conversion performed in the codec on the line card at the central office. Bit mapping function 22 thus maps the incoming digital data into digital words that have values corresponding exactly to the analog slicing levels of the A/D conversion at the codec.

As will be described in further detail hereinbelow, the actual constellation used by bit mapping function 22 is defined according to the response (i.e., the noise levels and channel distortion) of the analog subscriber loop and the digital impairments in digital trunk DT between modem 20 and ISP 10, and considering the maximum voiceband power that is permitted by regulation. The bit mapping that is carried out by bit mapping function 22 thus effectively determines the number of bits that may be carried in each symbol of the transmission. For example, if the channel is extremely noisy, each symbol may correspond to relatively few bits (i.e., providing larger gaps between slicing levels at the A/D); conversely, a relatively clean channel may permit up to as many as seven bits per symbol. In the case of eight-bit PCM, when fewer than eight bits per symbol are mapped by bit mapping function 22, only a subset of the 256 possible levels will be used. The number of bits per symbol thus determines the number of analog levels used in the PCM transmission; for example, if only six bits are to be transmitted for each symbol in an 8-bit PCM modulation scheme, the selected constellation will provide analog levels at only $2^6$, or 64, levels out of the 256 possible. Bit mapping function 22 carries out this mapping of the input bitstream to the desired constellation of analog levels.

Figure 5A:
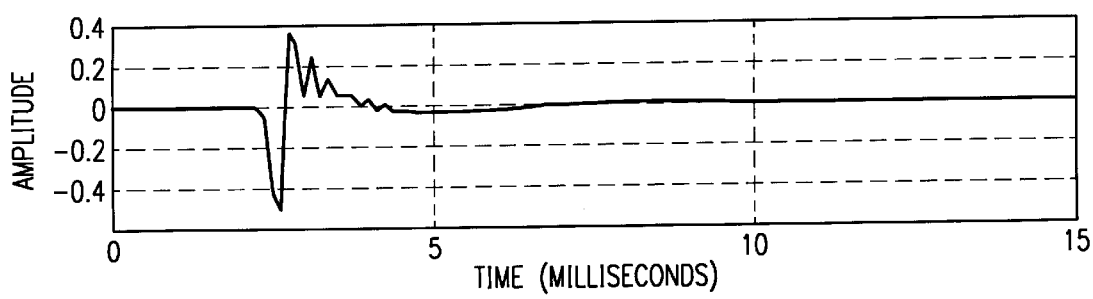
FIGS. 5a and 5b are plots illustrating the impulse response and frequency response, respectively, of a typical subscriber loop channel between a modem and a central office.
Figure 5B:
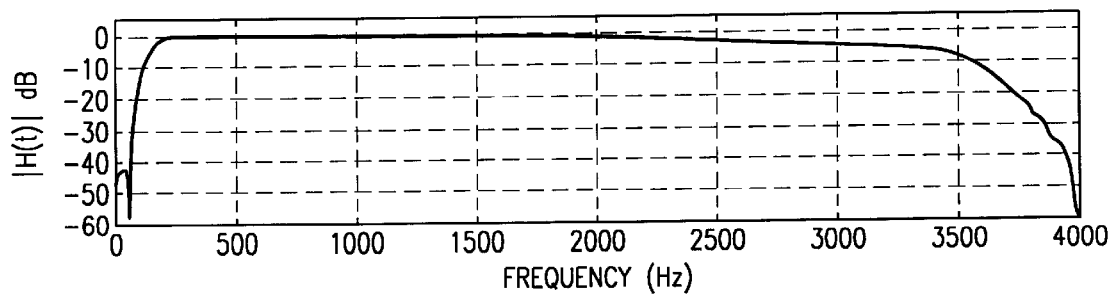
Figure 5C:
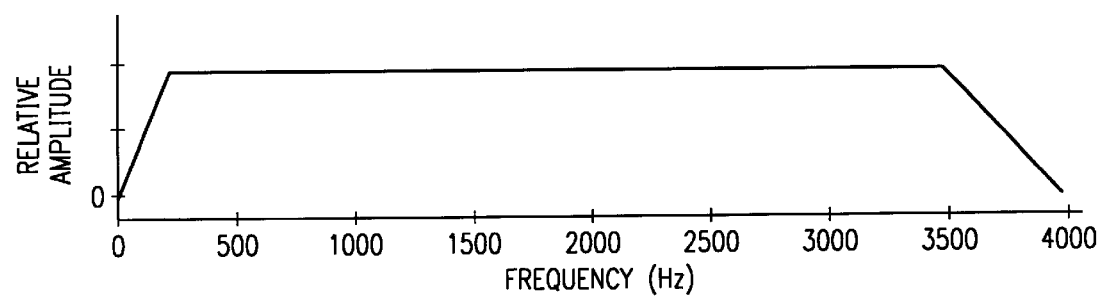
FIG. 5c is a plot illustrating the typical frequency response of a spectral shaping filter as used in upstream communications according to the preferred embodiment of the invention.

Following bit mapping function 22, modem 20 next applies spectral shaping function 24 to the mapped digital bitstream. As is known in the art, the communications channel including a modem, such as modem 20, and the central office, and analog subscriber loop ASL therebetween, has a response that is not ideal. A typical impulse response for such a communications channel, which includes the response of the subscriber loop and the responses of the transmit and receive filters, is illustrated in FIG. 5a; FIG. 5b shows the corresponding frequency response for this channel. Spectral shaping refers to the digital filter technique by way of which the transmitted signal is shaped according to the channel response, to maximize the transmitted data rate while remaining within the appropriate maximum average power specifications. FIG. 5c illustrates, in the frequency domain, an example of a typical spectral shaping filter. The technique of spectral shaping is known in the art, as applied to downstream PCM communications according to the V.90 recommendation of the ITU. According to this preferred embodiment of the invention, spectral shaping function 24 applies the convolutional spectral shaping (CSS) specified by ITU Recommendation V.90 by way of DSP 14 executing a digital processing program routine corresponding to this operation; it is contemplated that other, more powerful, spectral shaping techniques may be applied in spectral shaping function 24, as desired.

Referring back to FIG. 4, the spectrally shaped digital output of function 24 is next processed by pre-equalize filter function 26. Pre-equalize filter function 26 is a digital filter operation performed by DSP 14 in modem 20. The preferred embodiment of the present invention described hereinbelow describes a procedure for generating the coefficients of a linear pre-equalize filter function 26. Alternatively, pre-equalize filter function 26 may be implemented as an infinite impulse response (IIR) filter, in which case the coefficients could be determined by training a decision feedback type equalizer at digital modem 10'; it is contemplated that the IIR implementation will typically be easier to implement and also provide improved speed of operation over the linear implementation. In either case, the same general procedure for training would generally apply. The coefficients of pre-equalize filter function 26 are selected in order to compensate for the dispersion of the communications channel of the subscriber loop, as such channel dispersion affects the correspondence of the digital constellation to the slicing levels of A/D 6 in codec 2 at the associated central office. As will be described below, these coefficients are defined during the training of modem 20 and digital modem 10', taking into consideration the national power regulation imposed by the Federal Communications Commission over the analog subscriber loop.

Figure 6A:
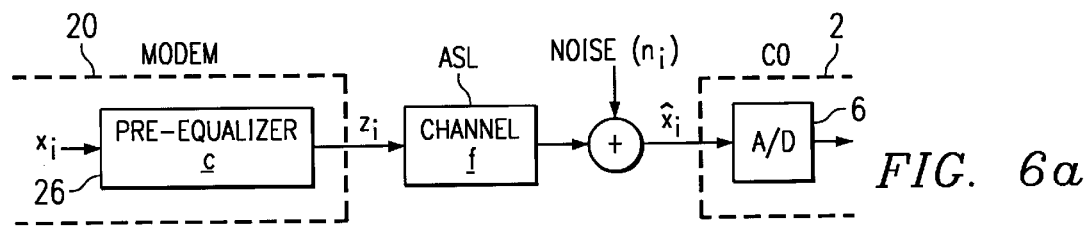
FIGS. 6a and 6b are block diagrams illustrating the nomenclature and theory of operation of pre-equalization according to the preferred embodiment of the invention.

The theory of operation of the present invention will now be described in detail, with attention directed to FIG. 6a. FIG. 6a illustrates pre-equalizer function 26 as receiving the spectrally shaped bit-mapped symbols $x_i$ from spectral shaping function 24. Pre-equalizer function 26 may be considered as applying a linear function c to symbols $x_i$, to produce pre-equalized symbol sequence $z_i$ that is applied to the communications channel ASL (including, in addition to subscriber loop ASL, any analog transmit and receive filters). Channel ASL may be modeled as a digital filter f. The output of channel ASL, with the addition of noise $n_i$, results in signal $\hat{x}_i$ that is received by A/D 6 in codec 2. The goal of pre-equalizer function 26 is thus to apply linear function c in such a manner that output signal $\hat{x}_i$ closely resembles the input of spectrally shaped symbols $x_i$; if this is accomplished, the analog levels represented by signal $\hat{x}_i$ will closely match the slicing levels of A/D 6, minimizing the quantization noise and thus permitting higher data rate upstream communications.

Consider linear function c of pre-equalizer function 26 to correspond to the following vector:

$$c = [c_K \ldots c_0 \ldots c_{-K}]^T$$

One may then express the output series $z_i$, at the output of pre-equalizer function 26, as follows:

$$z_i = \sum_{j=-K}^{K} c_j x_{i-j}$$

In this nomenclature, the filter function f embodied in channel ASL may be expressed as:

$$f = [f_0 \, f_1 \, f_2 \, \ldots \, f_L]^T$$

According to the preferred embodiment of the invention; the coefficients $c_i$ in the linear filter c of pre-equalize function 26 are to be selected in order to minimize the mean square error between the input bitstream $x_i$ and the output signal $\hat{x}_i$ that is applied to A/D 6 at the central office. Additionally, the average power of the signal $z_i$ transmitted over channel ASL must be maintained below a specified maximum average transmitted power $E_T$. According to the preferred embodiment of the invention, the input power $E[x_i^2]$ is initially set to a fixed value $\sigma_x^2$; later, the power value $\sigma_x^2$ varied in order to maximize the transmitted data rate, subject to a fixed performance level (or bit error rate).

This minimization is accomplished, according to the preferred embodiment of the invention, using the method of Lagrange multipliers upon the expression:

$$J(\underline{c}, \lambda) = E[(x_i - \hat{x}_i)^2] + \lambda (E[z_i^2] - E_T)$$

Figure 6B:
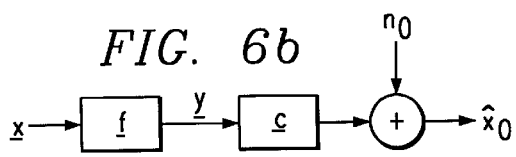

This expression incorporates the minimization of the error in the transmitted and input signals, in the first term of the sum, arid the maximum average power limitation in the second term. Minimization of this expression may be effected by rewriting the constraint terms in matrix form, and as a function only of the pre-equalizer linear function coefficients $c_i$ but not in terms of the channel coefficients $f_i$. This may be accomplished, as it is observed, according to the present invention, that the output signal $\hat{x}_i$ would not be affected by the interchanging of the order of pre-equalizer function 26 and the channel ASL filter function in the system of FIG. 6a, as both filters are linear. FIG. 6b illustrates this interchanging of the functions, for purposes of defining the nomenclature in this description. As shown in FIG. 6b, an intermediate vector y corresponds to the application of filter function f of channel ASL to the input vector x, and the output signal $\hat{x}_o$ corresponds to the application of pre-equalize linear filter function c to intermediate signal series $y_i$ plus the effects of noise $n_i$. In effect:

$$y_i = \sum_{j=0}^{L} f_j x_{i-j}$$

or, in matrix form:

$$y = [y_{-K} \ldots y_0 \ldots y_K]^T = Hx$$

where:

$$x = [x_{-K} \ldots x_0 \ldots x_K]^T$$

and $$H = \begin{bmatrix} f_L & \cdots & f_1 & f_0 & 0 & \cdots & 0 \\ 0 & f_L & \cdots & f_1 & f_0 & \cdots & 0 \\ \vdots & \vdots & \ddots & \ddots & \ddots & \ddots & \vdots \\ 0 & \cdots & 0 & f_L & \cdots & f_1 & f_0 \end{bmatrix}$$

Using the interchanged approach illustrated in FIG. 6b, the mean square error between the input series $x_i$ and the output signal $\hat{x}_i$ becomes:

$$MSE = E[(x_o - \hat{x}_o)^2]$$
$$= E[(\underline{c}^T \underline{y} + n_o - x_o)^2]$$
$$= \underline{c}^T R_{yy} \underline{c} + \sigma_n^2 + \sigma_x^2 - 2\underline{c}^T r_{yx}$$

where $\sigma_n^2$ corresponds to the power level $E[n_o^2]$ of the noise. The autocorrelation $R_{yy}$ is defined as follows:

$$R_{yy} = E[\underline{y}\underline{y}^T]$$
$$= E[H\underline{x}\underline{x}^T H^T]$$
$$= H R_{xx} H^T$$

In this expression, $R_{xx}$ is the autocorrelation matrix of x, which depends upon the spectral shaping technique applied by spectral shaping function 24. Referring back to the expression for mean square error MSE, the term $r_{yx}$ refers to:

$$r_{yx} = E[\underline{y} x_o]$$
$$= E[H \underline{x} x_o]$$
$$= H[R_{xx}]_{col=K+L+1}$$

where $[R_{xx}]_{col=K+L+1}$ is the $(K+L+1)^{th}$ column of the autocorrelation matrix $R_{xx}$.

Referring back to the above expression $J(c,\lambda)$ being minimized, the average power $E[z_i^2]$ may be expressed in terms of pre-equalizer linear filter function c as:

$$E[z_i^2] = E[\underline{c}^T \underline{x}\underline{x}^T \underline{c}]$$
$$= \underline{c}^T R_{xx} \underline{c}$$

Based on the foregoing, the minimized expression $J(c,\lambda)$ may now be expressed as follows:

$$J(c,\lambda) = c^T R_{yy} c + \sigma_n^2 + \sigma_x^2 - 2c^T r_{yx} + \lambda(c^T R_{xx} c - E_T)$$

Solving for extrema by differentiation and setting the derivative to zero yields:

$$(R_{yy} + \lambda R_{xx})c = r_{yx}$$

This solution is a set of linear equations for pre-equalizer linear filter function c in terms of the Lagrange multiplier $\lambda$. Multiplier $\lambda$ may be determined from the average power constraint equation:

$$E_T = c^T R_{xx} c$$

These steps solving the set of linear equations for filter function c in combination with defining Lagrange multiplier $\lambda$ may be readily performed numerically, using a digital signal processor such as DSP 14. Examples of such numerical operations will now be described in detail.

In understanding the numerical solution of this set of linear equations, it is instructive to first consider the case of a spectrally flat input, i.e. where no spectral shaping is applied (spectral shaping function 24 absent). In this situation, the autocorrelation matrix $R_{xx}$ of the input signal x is the identity matrix I. The error derivative solution $(R_{yy}+\lambda R_{xx})c=r_{yx}$ then reduces to:

$$(R_{yy}+\lambda I)c=r_{yx}$$

and the maximum power equation reduces to:

$$c^T c = E_T$$

The autocorrelation matrix $R_{yy}$ can be expressed in the form $R_{yy}=USU^T$, where U is a unitary matrix and S is a diagonal matrix with all positive entries (singular value decomposition). The error derivative solution equation $(R_{yy}+\lambda I)c=r_{yx}$ becomes:

$$U(S+\lambda I)U^T c = r_{yx}$$

or:

$$(S+\lambda I)U^T c = U^T r_{yx}$$

or, solving for pre-equalize linear function c:

$$c=[(S+\lambda I)U^T]^{-1}U^T r_{yx}$$

Since S is a diagonal matrix (as, of course, is $\lambda I$), the inverse $(S+\lambda I)^{-1}$ is readily derivable. It has been observed, in connection with the present invention, that the 2-norm of c, $c^T c$ is inversely proportional to $\lambda$; as a result, it is numerically easy to find a value of $\lambda$ that satisfies the average power limit equation $c^T c = E_T$, it being understood that selection of the optimal $\lambda$ must be selected from (2K+2) sections of the real number line (since the matrix S is of dimension $(2K+1)^2$).

As noted above, however, the inclusion of spectral shaping function 24 in the transmission of signals from modem 20 is much preferred, to pre-shape the spectrum of the input signal to the channel response. In this situation, the autocorrelation matrix $R_{xx}$ is not equal to identity matrix I. It has been found, according to the present invention, that the set of linear equations to be solved from the differentiation of the function $J(c,\lambda)$ may similarly be reduced, as will now be described.

Because matrix $R_{xx}$ is an autocorrelation matrix, it may be expressed in terms of its Cholesky decomposition, namely $R_{xx}=GG^T$, where G is a lower triangular matrix with positive diagonal entries. Referring back to the error term equation $(R_{yy}+\lambda R_{xx})c=r_{yx}$, one may readily determine:

$$(R_{yy}+\lambda R_{xx})c=(R_{yy}+\lambda GG^T)c=G(G^{-1}R_{yy}G^{-T}+\lambda I)G^T c = r_{yx}$$

Simplification of this expression using $b=G^T c$ and $a=G^{-1}r_{yx}$ permits the expression:

$$(G^{-1}R_{yy}G^{-T}+\lambda I)b=a$$

The average power constraint relationship in this spectrally shaped case of $E_T = c^T R_{xx} c$ may be rewritten as:

$$E_T = c^T GG^T c = b^T b$$

These two equations are now in the same form as the spectrally flat case of:

$$(R_{yy}+\lambda I)c=r_{yx}$$

and:

$$c^T c = E_T$$

and thus suitable for solution by way of singular value decomposition.

As will become apparent from the following description, the training sequence according to the preferred embodiment of the invention provides estimates of autocorrelation matrix $R_{yy}$ and cross-correlation vector $r_{yx}$, measured at the digital modem 10' at ISP 10. Additionally, digital modem 10' will know the spectral shaping parameters of spectral shaping function 24, from which the autocorrelation matrix $R_{xx}$ may be generated. Further, a training sequence may be used to obtain reliable estimates of the sampling levels and sampling times of the A/D conversion in the network codec, as knowledge of these quantities is required in order to minimize the quantization error.

Referring back to FIG. 4, the digital signal output from pre-equalize filter function 26 in modem 20 is then applied to digital-to-analog converter (DAC) 28. DAC 28 provides an analog signal, based on the digital signals applied thereto by pre-equalize filter function 26, that is effectively modulated into a pulse code modulation (PCM) signal. This analog signal is then driven onto analog subscriber loop ASL, to which codec 2 is connected.

Codec 2, or more specifically a line card including codec 2 at central office CO, includes anti-aliasing filter 30, as is conventional in the art, followed by A/D function 6, which converts the PCM analog levels into a series of digital words. As is known in the art and as discussed above, A/D function 6 samples the incoming PCM modulated signal, for example at a frequency of 8 kHz, compares each sampled amplitude to its preselected slicing levels, and generates a digital output corresponding to the slicing level closest to the sampled analog amplitude. These digital words are communicated on digital trunk DT to digital modem 10' at ISP 10, as shown in FIG. 4.

Located within digital modem 10' is inverse spectral shaping function 34, which is a digital function that compensates for the effects of spectral shaping function 24 in modem 20. Digital modem 10' further includes inverse bit mapping function 36, which reverses the operation of bit mapping function 22 in modem 20, thus restoring the proper ordering of the digital signal. The operations of inverse spectral shaping function 34 and inverse bit mapping function 36 are digital operations that are readily performable by digital signal processing circuitry, such as a DSP of the capability corresponding to that of the TMS320c6x class of DSPs available from Texas Instruments Incorporated. As a result, the output of inverse bit mapping function 36 provides a faithful reproduction of the input bitstream presented to modem 20.

Figure 7:
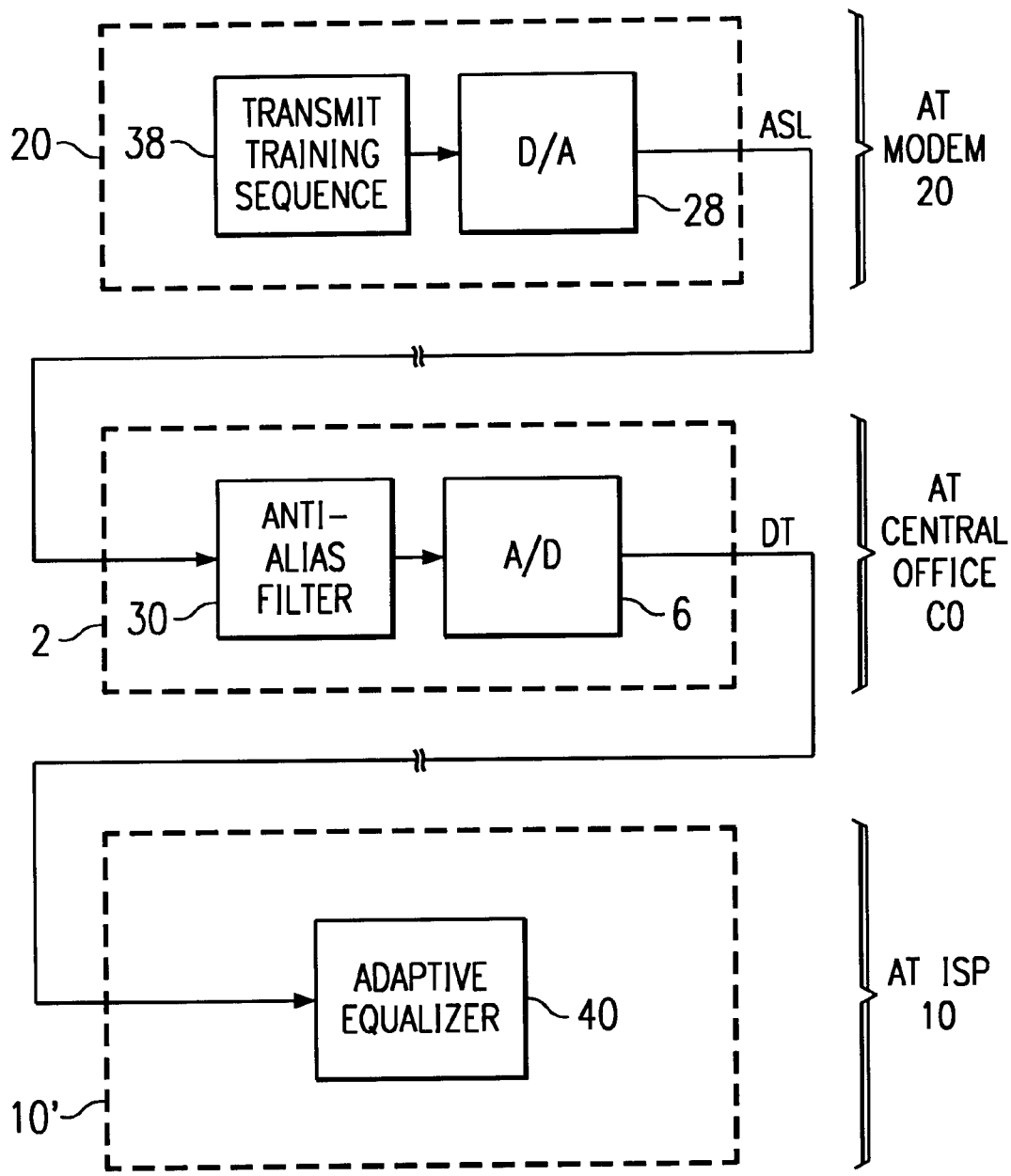
FIG. 7 is a functional diagram illustrating the functions carried out by the combination of the client modem, central office codec, and the digital modem, in carrying out the training sequence of FIG. 4 according to the preferred embodiment of the invention.
Figure 8:
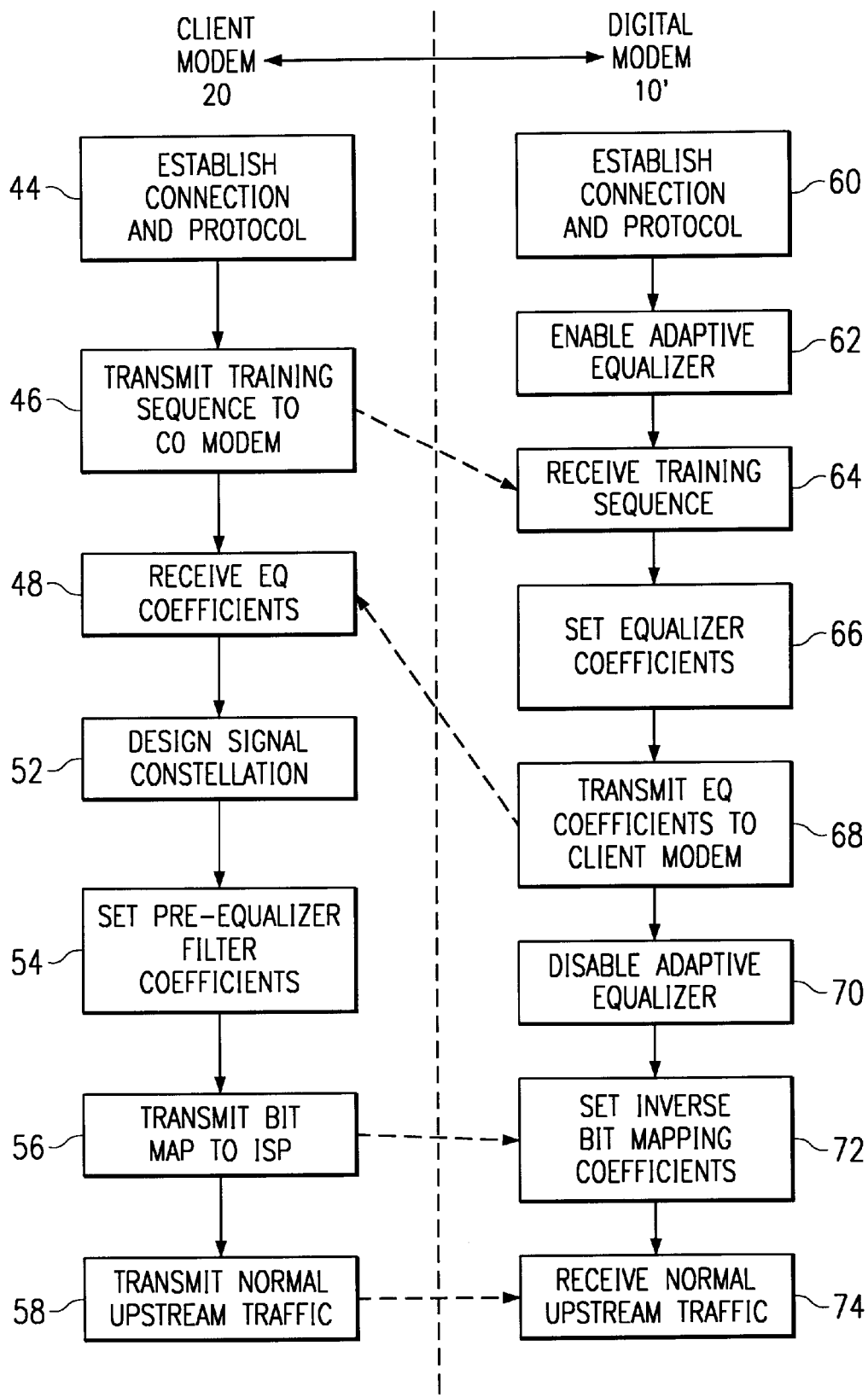
FIG. 8 is a flow diagram illustrating the operation of the preferred embodiment of the present invention, in the training of a modem connection between the client modem and the digital modem, according to the preferred embodiment of the invention.

Referring now to FIGS. 7 and 8, the method of training modem 20, particularly in setting the coefficients to be used by pre-equalize digital filter function 26 illustrated in FIG. 4, will now be described in detail.

FIG. 7 illustrates the functional arrangement of modem 20, central office CO, and digital modem 10' at ISP 10, during the execution of the modem training operation according to the preferred embodiment of the invention (and which will be described herein relative to FIG. 8). As shown in FIG. 7, modem 20 includes the function by way of which a training sequence is generated and applied to analog subscriber loop ASL. The training sequence generated by modem 20 may correspond to conventional modem training sequences as may be used in the establishing of a modem connection according to the v.90 protocol; typically, such training sequences correspond to the generation of a pseudo-random sequence. Of course, since digital modem 10' must also be aware of the training sequence, the training sequence cannot be purely random, but is instead a predictable sequence that gives the appearance of randomness. As suggested by FIG. 7, bit mapping function 22, spectral shaping function 24, and pre-equalize filter function 26 are not performed by modem 20 relative to the transmit function 38, but such modulation and encoding functions (not shown) as necessary for communication of the sequence over analog subscriber loop ASL will of course be performed.

Codec 2 of central office CO includes anti-aliasing filter 30 and A/D 6, as in the case of normal communication shown relative to FIG. 4. Codec 2 is in communication with digital modem 10' in ISP 10 over digital trunk DT, as before.

During the training operations according to the preferred embodiment of the invention, digital modem 10' performs adaptive equalizer process 40, which involves the estimation of certain correlation vectors, from which the coefficients of pre-equalize function 26 in modem 20 may be computed. Alternatively, a constrained LMS-type algorithm may be used to adjust the operation of adaptive equalizer function 40, thus effecting dynamic equalizing. In either case, during the training operation, as suggested by FIG. 8, digital modem 10' does not include inverse spectral shaping function 34 and inverse bit mapping function 26 (FIG. 4).

Referring now to FIG. 8, the method of operating modem 20 in conjunction with digital modem 10' in the training of modem 20 according to the preferred embodiment of the invention will now be described. As illustrated in FIG. 8, client modem 20 and digital modem 10' each operate according to a flow of operations, but in cooperation with one another. As illustrated in FIG. 8, the method begins with modem 20 performing process 44 to establish the connection with ISP 10, and the protocol with which this connection will be made; typically, process 44 includes the dial-up operation or other log-on process by way of which the connection between modem 20 and ISP 10, through central office CO, is made. Digital modem 10' similarly performs its connection and protocol establishing function 60, in cooperation with the signals transmitted in this regard by modem 20. Processes 44, 60 are performed according to conventional techniques, except that, at some point during processes 44, 60, modem 20 indicates that the desired connection is of a type corresponding to the preferred embodiment of the invention, as functionally illustrated in FIG. 4. In response to this indication, digital modem 10' performs process 62, by way of which adaptive equalizer function 40 is enabled, so that the pre-equalize coefficients may be defined and set as will be described hereinbelow.

In process 46, training sequence transmit function 38 in modem 20 transmits the training sequence (in PCM modulated fashion) over analog subscriber loop ASL through codec 2 of central office CO. As noted above, this training sequence is preferably a pseudo-random sequence, with frequencies over the channel bandwidth, so that an accurate estimate of the channel properties may be made. This training sequence is received by adaptive equalizer 40 in digital modem 10', after analog-to-digital conversion by A/D 6 in codec 2. Adaptive equalizer 40 essentially computes a frequency equalization function for this signal, based upon knowledge of the training sequence, as will now be described relative to the preferred embodiment of the invention.

Figure 9:
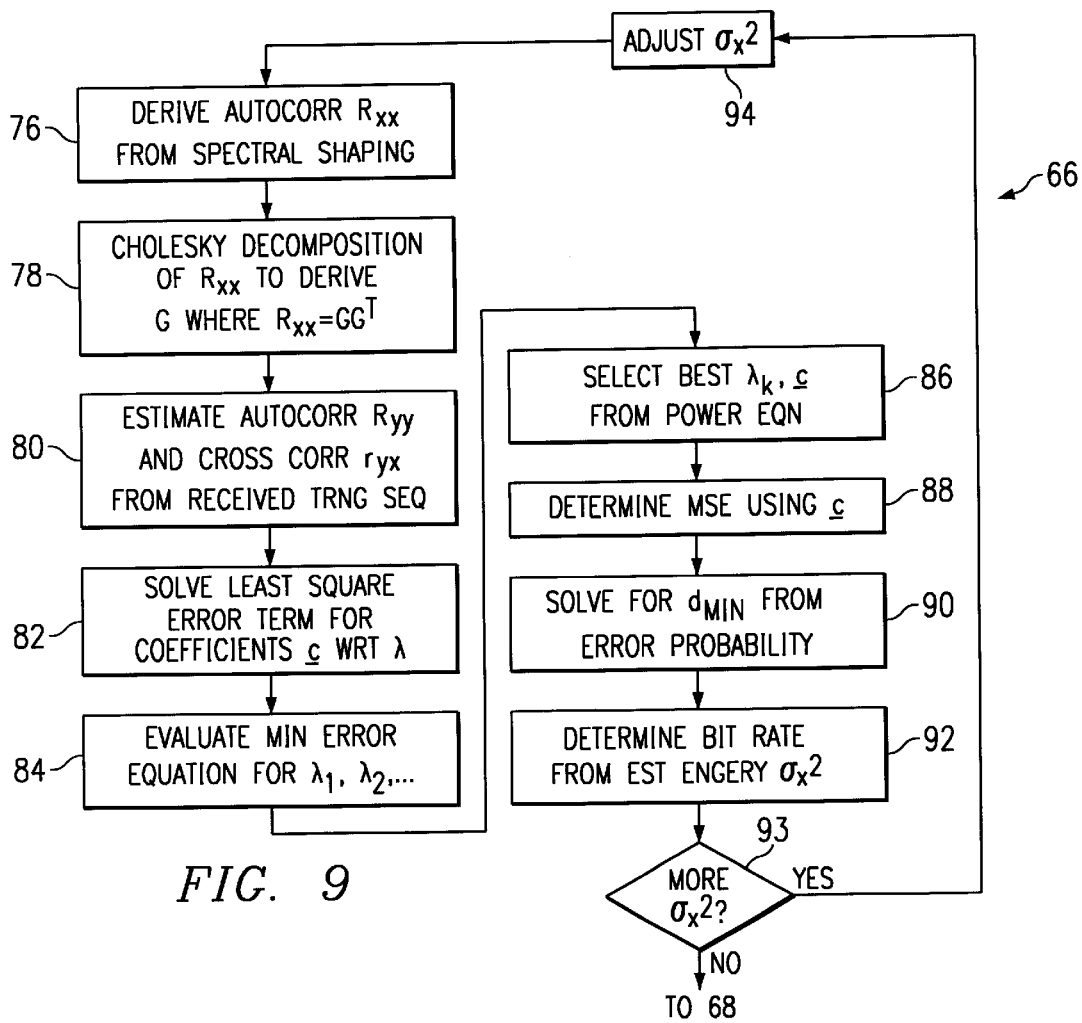
FIG. 9 is a flow diagram illustrating the operation of the process of determining the pre-equalizer coefficients as performed in the training of a modem connection between the client modem and the digital modem, according to the preferred embodiment of the invention.

More specifically, the operation of adaptive equalizer function 40 corresponds to process 66 of FIG. 8, in which digital modem 10' sets the equalization coefficients of adaptive equalizer function 40. As illustrated in FIG. 6b, where no pre-equalization filter is included in transmission (as is the case in the training operation of FIGS. 7 and 8), the equalization coefficients correspond to linear filter function c, which is the same filter function as may be then used for pre-equalization function 26 in modem 20 of FIG. 4 during normal communication, after the training sequence. As such, the determination of the equalization coefficients in process 66 determines the coefficients of pre-equalization filter function c. Referring now to FIG. 9, operation of digital modem 10' in performing process 66 will now be described in more detail, for the preferred embodiment of the invention in which spectral shaping will be applied.

Additionally, process 66 can be used to determine the optimal bit rate available over subscriber loop ASL, as will now be described. Typically, a bit error rate (e.g., $10^{-5}$ or $10^{-6}$) is specified by the appropriate communication standard, and as such it is desired, in the training of the communications link, to maximize the data rate within the specified error rate. In this embodiment of the invention, process 66 iteratively establishes both the coefficients c of pre-equalization filter function 26 and also determines the maximum bit rate within the specified error rate, from which the transmission constellation may be determined.

Referring now to FIG. 9, process 66 begins with process 76, in which digital modem 10' derives autocorrelation matrix $R_{xx}$ from the known spectral shaping characteristic to be applied in transmission. Digital modem 10' then executes process 78, preferably by way of execution of a digital signal processor routine, to perform Cholesky decomposition of autocorrelation matrix $R_{xx}$. As is known in the art, Cholesky decomposition decomposes a given matrix into the product of a lower triangular matrix and its transpose; in this case, Cholesky decomposition process 78 derives matrix G based upon autocorrelation matrix $R_{xx}$ as follows:

$$R_{xx} = GG^T$$

Lower triangular matrix G will be used in the solution of filter function c, as will be described below. Processes 76, 78 may be pre-solved based upon the known input sequence, and the results stored in memory at digital modem 10' or communicated to digital modem 10' during initialization, along with an initial estimate $\sigma_x^2$ of the input energy.

Alternatively, it has been observed by way of modeling that one may carry out process 66 using the assumption that transmission will be spectrally flat, even if spectral shaping is indeed used. Such modeling indicates that the error resulting from this assumption may be tolerable; if so, the computations required in process 66 will be significantly reduced. This reduction in computational complexity is due to the autocorrelation matrix $R_{xx}$ being equal to identity matrix I in the spectrally flat case, thus eliminating the need to perform Cholesky decomposition process 78.

Referring back to FIG. 9, digital modem 10' next performs process 80 to estimate auto-correlation matrix $R_{yy}$ and cross-correlation vector $r_{yx}$ from its measurement of the pseudo-random training sequence, as received and as compared against the expected sequence. The estimates made in process 80 are conventional in the art, and as such may be made by conventional techniques.

The estimates of auto-correlation matrix $R_{yy}$ and cross-correlation vector $r_{xy}$, in combination with the decomposed matrix G (and its easily determined inverse $G^{-1}$ and transpose $G^T$) are then used by digital modem 10' in process 82, in which the error term is solved, at least to derive the linear function coefficients c in terms of $\lambda$. As discussed above in the description of the theory of operation, in this case of spectral shaping, the solution sought in process 82 corresponds to the solution of:

$$G(G^{-1}R_{yy}G^{-T}+\lambda I)c = r_{yx}$$

or, using $b=G^T c$ and $a=G^{-1}r_{yx}$:

$$(G^{-1}R_{yy}G^{-T}+\lambda I)b = a$$

As described above relative to the spectrally flat case, this error term may be readily solved by way of single value decomposition techniques. Accordingly, the execution of process 82 provides a relationship between linear function coefficients c and $\lambda$.

Digital modem 10' next performs processes 84, 86 to determine the proper value of scalar $\lambda$, based upon the specified maximum average transmit power level $E_T$. As noted above, it has been observed that the product $c^T c$ decreases monotonically with $\lambda$. According to the preferred embodiment of the invention, process 84 evaluates the minimum error equation:

$$(G^{-1}R_{yy}G^{-T}+\lambda I)b = a$$

for a series of multiple selected $\lambda$ values $\lambda_1$, $\lambda_2$, etc. The sets of linear function coefficients c resulting from the evaluations of process 84 are then evaluated, in process 86, according to the power equation:

$$E = c^T GG^T c = b^T b$$

The specific value of $\lambda_k$ that provides a power value E closest to (but not over) the maximum average power limit $E_T$ is then selected in process 86, as is the corresponding set of linear function coefficients c.

Alternatively, the solution of these equations to determine $\lambda$ and linear function coefficients c may be performed by way of regression of the error term result of process 82 to determine the correct value of $\lambda$, i.e. for the case where the product $c^T c$ equals maximum power level $E_T$.

In either case, the determined linear function coefficients c are then used to determine the transmission bit rate available over subscriber loop ASL. In this regard, digital modem 10' performs process 88 to evaluate the mean squared error (MSE) for the channel, using the determined linear function coefficients c, according to the previously-described equation:

$$MSE = E[(x_o - \hat{x}_o)^2] = c^T R_{yy} c + \sigma_n^{2+\sigma_x^2} - 2c^T r_{yx}$$

In this MSE evaluation, the current estimate $\sigma_x^2$ of the input energy is used, along with a measure $\sigma_n^2$ of the noise energy of the channel.

Upon determining the MSE in process 88, digital modem 10' then solves for the Euclidean distance $d_{min}$ between adjacent constellation points in process 90 for the specified error rate. As is well known in the art, the probability of an error in the demodulation of a modulated signal depends both upon the noise in the signal and also upon the proximity between adjacent points in the amplitude (or phase and amplitude) spectrum. In the PCM case, the Euclidean distance $d_{min}$ is simply the difference between adjacent slicing levels. According to the preferred embodiment of the invention, process 90 is performed by digital modem 10' evaluating the error probability P(e) equation:

$$P(e) = Q\left(\frac{d_{min}}{2\sigma}\right)$$

where error probability P(e) is set to the specified level (e.g., $10^{-5}$ or $10^{-6}$), where the Q function is defined as:

$$Q(x) = \int_x^\infty \frac{1}{\sqrt{2\pi}} e^{-\frac{x^2}{2}} dx$$

and where $\sigma^2 = \sigma_n^2 + MSE$.

Upon obtaining the Euclidean distance $d_{min}$ in process 90, digital modem 10' then executes process 92 to derive the bit rate available for the current estimate of input energy $\sigma_x^2$ and the Euclidean distance $d_{min}$ derived from the noise levels, MSE, and specified bit error rate in process 90. Decision 93 is then performed by digital model 10' to determine if additional iterations of estimated input energy $\sigma_x^2$ remain to be analyzed; if so (decision 93 is YES), the estimated input energy $\sigma_x^2$ is adjusted as desired in process 94 (e.g., by determining if additional bit rate may be available), and process 66 is repeated, beginning at process 76.

According to an alternative approach, the iterative solution of process 66 may be streamlined. For example, the equation $\sigma^2 = \sigma_n^2 + MSE$ indicates that the $\sigma$ value is dominated by random noise for insignificant levels of mean square error MSE. In this case, additional MSE can be tolerated, as increases in its value will not be reflected to any significant degree in the $\sigma$ value. Accordingly, the iterative nature of process 66 may be implemented by simply increasing the estimated input energy $\sigma_x^2$ until the MSE determined in process 88 is approximately equal to the noise energy $\sigma_n^2$ (in other words, until the MSE is a significant factor). This eliminates the necessity of performing processes 90, 92 upon each iteration of estimated input energy $\sigma_x^2$.

Upon completion of the desired iterations of input energy $\sigma_x^2$ (decision 93 is NO), the bit rate is determined from the last iteration of process 92, and process 66 is complete. At this point, the linear function coefficients c for pre-equalize filter function 26 are determined, as is the available bit rate for the channel. These parameters may then be used to establish the operation of modem 20. Accordingly, digital modem 10' then transmits these equalizer coefficients c to modem 20, in process 68 of FIG. 8; digital modem 10' then disables its adaptive equalizer function 40, to await normal communications.

Referring still to FIG. 8, modem 20 receives the equalization coefficients, or linear filter function c, from digital modem 10' in process 48. The design of the signal constellation to be used in bit mapping function 22 (FIG. 4) is based upon the choice of input energy $\sigma_x^2$ and the corresponding minimum distance $d_{min}$ determined in process 66 (process 92 of FIG. 9). The selected signal constellation corresponds to the number of bits to be transmitted within each symbol which, in this embodiment of the invention, determines the number of A/D slicing levels of the 256 available levels will be transmitted. For example, if the signal constellation design of process 52 indicates that six bits are to be provided in each symbol, the signal constellation will be defined to map each group of six bits in the input bitstream into one of sixty-four possible analog PCM levels. Of course, more or fewer bits may be provided per symbol, as a result of process 52, depending upon the noise and distortion characteristics of the transmission channel as measured during training.

Figure 10A:
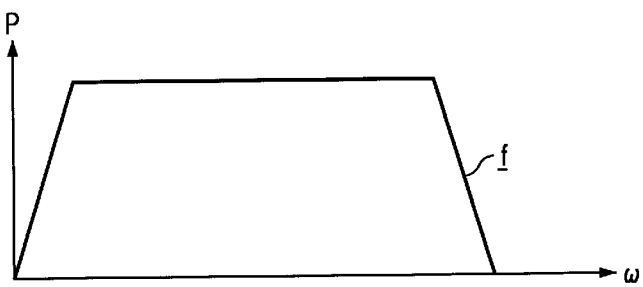
FIG. 10a is a frequency characteristic of a typical channel.
Figure 10B:
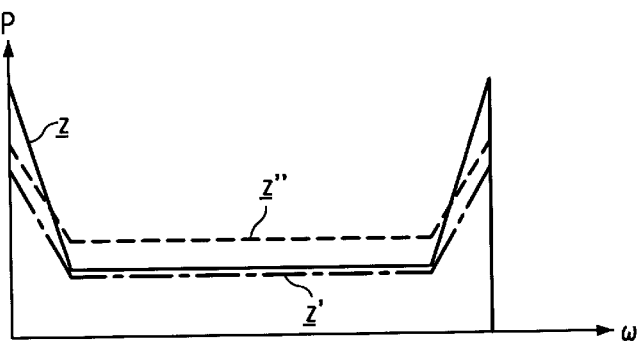
FIG. 10b is a frequency characteristic of the output of the pre-equalize filter function according to the preferred embodiment of the invention.

The effects of process 52 will now be described relative to FIGS. 10a and 10b. FIG. 10a illustrates the frequency characteristic f of a typical ASL channel, assuming that the only effect present in the channel is the frequency rolloff due to bandlimiting. As evident from this characteristic, some amount of rolloff is present at the higher and lower frequencies; as discussed above, typical ASL channels do not provide the full 4 kHz of bandwidth, but instead provide up to approximately 3.3 kHz of useful bandwidth, as evident in FIG. 10a. This reduced bandwidth is measured during the training process described above, relative to FIGS. 8 and 9. As described above relative to FIG. 5b, spectral shaping of the input signal can serve to increase the reliability of the data transmitted over the bandlimited channel characteristic of FIG. 10a. The application if only pre-equalize filter function 26 will produce signal z, at the output of pre-equalize filter function 26 (see FIG. 6a), as shown in FIG. 10b. This signal z has relatively high gain at the extremes in frequency to counteract the rolloff of channel frequency characteristic f as shown in FIG. 10a.

According to the preferred embodiment of the invention, the input signal has its amplitude at the extreme frequencies of the bandwidth limited, by the use of spectral shaping as described above. The effect of this spectral shaping is to reduce the amplitude of the signal at the low and high frequencies. The effects of this reduction are qualitatively illustrated by the frequency characteristic signal z' in FIG. 10b. However, as discussed above, the average transmit power must be kept at or below a certain threshold $E_T$. The reduction in power at the extreme frequencies permits an increase in the energy gain across all frequencies while still meeting the power constraint, as shown by characteristic z" in FIG. 10b.

As a result of this consideration of spectral shaping, the overall power of the input signal may be increased, resulting in higher data rates, while still providing reliable data transmission. Some flexibility may also be provided according to the preferred embodiment of the invention, as a tradeoff between pre-equalization gain with spectral shaping and input power may be optimized for the particular modem application. In any case, the signal to noise ratio provided according to the preferred embodiment of the invention, in which spectral shaping function 24 of FIG. 4 is utilized and the proper power gain and signal constellation computed in process 52, is improved over that of conventional techniques.

In process 54, modem 20 then next sets the coefficients of pre-equalize filter function 26 (FIG. 4) to the linear filter characteristic c determined in process 66. As noted above, process 66 determines this characteristic c considering the maximum power level $E_T$, as well as possibly considering the effects of spectral shaping. According to the preferred embodiment of the invention, pre-equalize filter function 26 is realized as an FIR digital filter, for which the linear filter characteristic c relates directly to the coefficients of this filter.

Following process 56, modem 20 transmits to digital modem 10', in process 58, the bit mapping selected in process 52; upon receipt, digital modem 10' sets its inverse bit mapping coefficients accordingly, in process 72. The configuration of modem 20 and digital modem 10' is now complete, such that the functional operation therebetween corresponds to that illustrated in FIG. 4, considering the characteristics of the channels therebetween. Normal upstream traffic may now be transmitted from modem 20 to digital modem 10', as illustrated in processes 58, 74 of FIG. 8.

Once normal upstream traffic is established, it may be desirable to periodically monitor the channel characteristics, and adjust the pre-equalize function coefficients, based upon the error between the received signal and the corresponding demodulated data. Such monitoring and adjustment of the coefficients may be carried out by way of least-mean-squared analysis, along with,communication of an error vector over the subscriber loop from digital modem 10' to client modem 20.

According to the preferred embodiment of the invention, significant benefits in the transmission of upstream traffic according to conventional modem standards, such as the V.90 recommendation, are obtained. Firstly, the present invention provides improved upstream data rates over that permitted by conventional technology, primarily by avoiding the effects of quantization noise at the central office A/D conversion. This is accomplished by the client modem being able to transmit PCM levels that are received by the central office A/D converter at levels quite near the slicing levels of the conversion, with the signal being pre-equalized to account for channel distortion effects. Further, the present invention permits the upstream traffic to be transmitted at an optimal power level, thus further improving the signal-to-noise ratio of the transmission. As a result, the data rate of upstream traffic is contemplated to be increased; in this regard, simulation of the preferred embodiment of the present invention has indicated that an upstream bit rate of 50.6 kbps may be reached, at a signal to noise ratio of 60 dB, and error rates of on the order of $10^{-5}$ to $10^{-6}$ SER, using a pre-equalize FIR digital filter with 1001 taps. Such performance is a significant improvement over conventional upstream transmission.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of communicating digital data from a host computer to an Internet service provider over a transmission channel, the transmission channel including an analog subscriber loop between a client modem associated with the host computer and a central office, and also including a digital trunk between the central office and a digital modem at the Internet service provider, the method comprising the steps of:

bit mapping a digital signal bitstream into a series of mapped digital symbols;

applying a pre-equalize filter function to the series of mapped digital symbols, the pre-equalize filter function defined according to response of the transmission channel and to a maximum average transmit power limit;

modulating the filtered mapped digital symbols into a pulse code modulated (PCM) analog signal;

transmitting the PCM analog signal over the analog subscriber loop;

at the central office, performing analog-to-digital conversion of the PCM analog signal into a converted digital signal;

transmitting the converted digital signal to the digital modem over a digital trunk;

at the Internet service provider, applying an inverse bit mapping function according to the signal constellation used in the mapping step, to recover the digital signal bitstream; and wherein the pre-equalizer filter function corresponds to a digital filter performed by digital signal processing circuitry and the digital filter has a series of coefficients defined by a minimization of the sum of a measure of an error between a signal received by the digital modem and a known transmitted signal, plus a measure of a difference between transmitted power and the maximum average transmit power limit.

2. A method of communicating digital data from a host computer to an Internet service provider over a transmission channel, the transmission channel including an analog subscriber loop between a client modem associated with the host computer and a central office, and also including a digital trunk between the central office and a digital modem at the Internet service provider, the method comprising the steps of:

bit mapping a digital signal bitstream into a series of mapped digital symbols;

applying a pre-equalize filter function to the series of mapped digital symbols, the pre-equalize filter function defined according to response of the transmission channel and to a maximum average transmit power limit;

modulating the filtered mapped digital symbols into a pulse code modulated (PCM) analog signal;

transmitting the PCM analog signal over the analog subscriber loop:

at the central office, performing analog-to-digital conversion of the PCM analog signal into a converted digital signal;

transmitting the converted digital signal to the digital modem over a digital trunk;

at the Internet service provider, applying an inverse bit mapping function according to the signal constellation used in the mapping step, to recover the digital signal bitstream; and training the pre-equalize filter function, the training including:
  enabling an adaptive equalizer function at the digital modem;
  transmitting a predetermined training sequence from the client modem to the digital modem;
  responsive to receiving the predetermined training sequence at the digital modem, determining coefficients of the adaptive equalizer function corresponding to a minimization of the sum of a measure of an error between the received training sequence and the predetermined training sequence, plus a measure of a difference between transmitted power and the maximum average transmit power limit; and
  communicating the coefficients of the adaptive equalizer function to the client modem.

3. The method of claim 2, wherein the step of determining coefficients of the adaptive equalizer function comprises:

estimating an autocorrelation matrix of the received training sequence;

estimating a cross-correlation vector of the received training sequence and the predetermined training sequence;

solving an error equation and an energy constraint equation, using the estimated autocorrelation matrix and cross-correlation vector, to derive a relationship between the coefficients of the adaptive-equalizer function and a power scalar;

iteratively determining a value of the power scalar corresponding to a maximum transmission bit rate for a specified performance level; and identifying, from the derived relationship, the coefficients of the adaptive equalizer function for the value of the power scalar corresponding to the maximum transmission bit rate.

4. The method of claim 3, further comprising:

before the solving step, deriving an input autocorrelation matrix corresponding to a spectral shaping function; and performing Cholesky decomposition of the input autocorrelation matrix;

wherein the solving step is performed using results of the Cholesky decomposition step.

5. The method of claim 2, wherein the bit mapping is performed according to a signal constellation;

and further comprising:
  defining the signal constellation responsive to signals communicated by the digital modem in the communicating step.

6. The method of claim 2, wherein the bit mapping step is performed according to a signal constellation corresponding to analog-to-digital conversion slicing levels;

and wherein the step of performing analog-to-digital conversion of the PCM analog signal uses the analog-to-digital conversion slicing levels.

7. The method of claim 2, wherein the pre-equalizer filter function corresponds to a digital filter performed by digital signal processing circuitry.

8. The method of claim 2, further comprising:

before the step of applying a pre-equalize filter function, applying a spectral shaping function to the mapped digital symbols to pre-shape low and high frequency components thereof.

9. The method of claim 8, further comprising:

at the Internet service provider, before the step of applying an inverse bit mapping function, applying an inverse spectral shaping function to the received converted digital signal.

10. The method of clam 6, wherein the bit mapping step maps the digital signal bitstream into a subset of the analog-to-digital conversion slicing levels used in the step of performing analog-to-digital conversion.

11. A modem for transmitting upstream communications to an Internet service provider by way of a transmission channel including analog communication to a central office and digital communication from the central office to the Internet service provider, comprising:

an interface function for coupling to a host computer;

analog circuitry for coupling to a telephone line; and digital signal processing circuitry, coupled to the interface function to receive a digital bitstream from the interface function and coupled to the analog circuitry, and comprising:
  a bit map function for mapping the received digital bitstream into a signal constellation to produce a series of mapped digital symbols;

a pre-equalize digital filter function, for applying a pre-equalize digital filter, to the mapped digital symbols, corresponding to response of the transmission channel and corresponding to a maximum average transmission power limit and the pre-equalize digital filter has a series of coefficients defined by a minimization of the sum of a measure of an error between a signal received by the digital modem and a known transmitted signal, plus a measure of a difference between transmitted power and the maximum average transmit power limit.

12. The modem of claim 11, wherein the digital signal processing circuitry comprises a programmable digital signal processor integrated circuit.

13. The modem of claim 12, wherein the bit map function and pre-equalize digital filter function are performed by the digital signal processor integrated circuit executing corresponding program routines.

14. The modem of claim 11, wherein the analog circuitry includes circuitry for modulating the filtered digital signals as a pulse code modulation (PCM) analog signal.

15. The modem of claim 11, wherein the bit map function maps the received digital bitstream into a signal constellation corresponding to a subset of the available analog-to-digital conversion slicing levels at the central office.

16. The modem of claim 11, wherein the modem is also for determining the signal constellation responsive to training signals communicated over the transmission channel.

17. The modem of claim 16, wherein the signal constellation corresponds to the characteristics of the transmission channel, to a maximum average transmission power limit, and to a specified performance criterion.

18. The modem of claim 16, wherein the bit map function maps the received digital bitstream into a signal constellation corresponding to a subset of the available analog-to-digital conversion slicing levels at the central office.

19. The modem of claim 11, wherein the signal constellation corresponds to analog-to-digital conversion slicing levels to be used at the central office.

* * * * *